(12) United States Patent
Kenaley et al.

(10) Patent No.: US 11,589,144 B2
(45) Date of Patent: Feb. 21, 2023

(54) PROTECTIVE COVER ASSEMBLY HAVING IMPROVED Z-STRENGTH

(71) Applicants: W. L. Gore & Associates, Inc., Newark, DE (US); W. L. Gore & Associates G.K., Tokyo (JP)

(72) Inventors: Ryan Kenaley, Newark, DE (US); Ryosuke Nakamura, Tokyo (JP); Dustin Perrin, Newark, DE (US)

(73) Assignees: W. L. Gore & Associates, Inc., Newark, DE (US); W. L. Gore & Associates G.K., Tokyo (JP)

( * ) Notice: Subject to any disclaimer, the term of this patent is extended or adjusted under 35 U.S.C. 154(b) by 122 days.

(21) Appl. No.: 16/757,300

(22) PCT Filed: Nov. 1, 2017

(86) PCT No.: PCT/US2017/059482
§ 371 (c)(1),
(2) Date: Apr. 17, 2020

(87) PCT Pub. No.: WO2019/089021
PCT Pub. Date: May 9, 2019

(65) Prior Publication Data
US 2021/0127185 A1 Apr. 29, 2021

(51) Int. Cl.
*H04R 1/02* (2006.01)
*C09J 7/26* (2018.01)

(52) U.S. Cl.
CPC ............... *H04R 1/023* (2013.01); *C09J 7/26* (2018.01); *H04R 1/025* (2013.01);
(Continued)

(58) Field of Classification Search
CPC .. H04R 1/023; H04R 1/025; C09J 7/26; C09J 2301/312; C09J 2203/326; C09J 2427/006
(Continued)

(56) References Cited

U.S. PATENT DOCUMENTS 5,828,012 A    10/1998   Repolle et al.
6,512,834 B1   1/2003    Banter et al.
(Continued)

FOREIGN PATENT DOCUMENTS

CN    1220755 A    6/1999
CN    1826906 A    9/2006
(Continued)

OTHER PUBLICATIONS

International Search Report and Written Opinion from International Appln. No. PCT/US2017/059482 dated Feb. 26, 2018.

*Primary Examiner* — Sean H Nguyen (57) ABSTRACT

A protective cover assembly is disclosed that comprises a porous expanded membrane having a plurality of pores, a first surface and a second surface opposite the first surface. The porous expanded membrane comprises an active area and a bonded area. The bonded area comprises an adhesive material that forms a bridge extending through the plurality of pores in the bonded area from the first surface to the second surface. The adhesive material in the bonded area improves the Z-strength and allows the porous expended membrane to be a lightweight material having a mass/area ratio of less than or equal to 3 g/m².

26 Claims, 5 Drawing Sheets

(52) U.S. Cl.
CPC .... *C09J 2203/326* (2013.01); *C09J 2301/312* (2020.08); *C09J 2427/006* (2013.01)

(58) Field of Classification Search
USPC ........................................................ 381/391
See application file for complete search history.

(56) References Cited

U.S. PATENT DOCUMENTS

| | | |
|---|---|---|
| 9,452,384 B2 | 9/2016 | Narita et al. |
| 2009/0226702 A1 | 9/2009 | Madsen et al. |
| 2017/0267897 A1* | 9/2017 | Yamamoto .............. B32B 27/40 |

FOREIGN PATENT DOCUMENTS

| | | |
|---|---|---|
| JP | 2009-044731 A | 2/2009 |
| JP | 2015-044187 A | 3/2015 |
| JP | 2015-139134 A | 7/2015 |
| JP | 2015-142282 A | 8/2015 |
| WO | 2011/140494 A1 | 11/2011 |
| WO | 2016/112925 A1 | 7/2016 |
| WO | 2017/004331 A1 | 1/2017 |
| WO | 2017/216084 A1 | 12/2017 |

\* cited by examiner

PROTECTIVE COVER ASSEMBLY HAVING IMPROVED Z-STRENGTH

RELATED APPLICATIONS

The present application is a national phase filing under 35 USC 371 of International Application No. PCT/US2017/059482 filed on Nov. 1, 2017, the entire contents and disclosures of which are hereby incorporated by reference.

TECHNICAL FIELD

The present invention relates generally to protective cover assemblies. More specifically, but not by way of limitation, the following describes a protective cover assembly containing a porous expanded membrane having adhesive penetration, such as an adhesive bridge, to improve Z-strength.

BACKGROUND

Modern electronic devices, including by not limited to radios, televisions, computers, tablets, cameras, toys, unmanned vehicles, cellular telephones and other micro-electro-mechanical systems (MEMS), include internal transducers, e.g., microphones, ringers, speakers, buzzers, sensors, accelerometers, gyroscopes, and the like, that communicate with the external environment through openings. Openings located near these transducers to enable sound to be transmitted or received, but also create an entry point for liquid, debris and particles that may cause damage to the electronic device. Protective cover assemblies have been developed to provide protection for internal electronics, including the transducers, from damage due to the entry of liquids, debris and particles through the openings.

Previously protective covers have been composed of a porous, fabric material constructed solely on reducing the material's resistance to air flow of which larger effective pore size resulting in thicker materials has been the means for achieving the high air flow parameters. Here, the amount of sound attenuation of the material is inversely proportional to the size of its pores, i.e., sound attenuation decreases as pore size increases. However, the size of the pores oppositely affects the water resistance of the material. Materials having extremely small or no pores are highly water resistant. To achieve water resistance there is a high sound attenuation, i.e. greater than 3 dB, resulting in poor sound quality.

Membranes, such as expanded polytetrafluoroethylene (ePTFE), have also been used as protective covers. A protective cover can transmit sound in two ways: the first is by allowing sound waves to pass through it, known as a resistive protective cover; the second is by vibrating to create sound waves, known as a vibroacoustic, or reactive, protective cover. Again increasing the resiliency of a membrane in an acoustic protective assembly against water penetration can decrease the ability of the assembly to properly transmit sound. In addition, membranes often lack mechanical integrity and are require an increase in thickness or are used with a support layer, typically a fabric or textile, to enhance the mechanical integrity. The increase thickness and support layer is not desirable for achieving better sound performance.

A captive construction that bonds a membrane between two adhesive support systems has been used as protective covers. U.S. Pat. No. 6,512,834 discloses sound-transmissive cover assembly that provides protection from the ambient environment to transducer devices, such as microphones, loudspeakers, buzzers, ringers and the like. The cover assembly has a microporous protective membrane that is captivated at the outer region near the edges between two adhesive support systems. An inner unbonded region surrounded by the bonded outer region is provided so that the protective membrane can displace or move in response to acoustic pressure waves.

US Pub. No. 2014/0138181 discloses a sound-transmitting membrane that allows passage of sounds and prevents passage of foreign matters, the sound-transmitting membrane including a supporting member and a resin porous membrane layered on the supporting member and containing polytetrafluoroethylene as a main component. The supporting member is a nonwoven fabric containing an elastomer.

US Pub. No. 20160376144 discloses a protective cover for a micro-electro-mechanical system for an ultrasonic transducer that has a low mass/area of less than 3 gsm.

U.S. Pat. No. 5,828,012 discloses a cover assembly having a protective membrane layer and a porous support material layer which are selectively bonded together at least in the outer region near their edges. An inner unbonded region surrounded by the bonded outer region is provided so that the protective membrane and porous support layer can vibrate or move independently in response to acoustic energy passing through them. An embodiment of the assembly includes at least one acoustic gasket attached to one or both of the layers so as to not impede independent movement of the layers.

U.S. Pat. No. 4,949,386 discloses a waterproof ground audio speaker apparatus having a speaker housing having a cylindrical sidewall, one open end and a closed end. A hollow cylindrical inner housing has a pair of open ends and is attached to the speaker housing with its walls in a spaced relationship to the walls of the speaker housing to form a passageway between the walls of the inner housing and the walls of the speaker housing. A loud speaker is mounted in the hollow inner housing facing one open end thereof for directing acoustical energy out the open end of the speaker housing and directing the backward propagating wave of the speaker through the hollow inner housing and through the passageway between the inner housing and the speaker housing to the open end of the speaker housing. A rigid domed supporting cover extends over the opening of the speaker housing and a filter membrane cover covers the open end of the speaker housing to protect the inside of the speaker enclosure. Annular flanges on either end of the speaker housing helps support the speaker housing in the earth and a special filter membrane made of laminated polyester and a polytetrafluoroethylene sheet which allows the acoustical energy to pass therethrough while blocking the ingress of fluids and other materials into the speaker housing.

A continuing problem of improving sound quality exists for protective cover assemblies. The foregoing illustrates limitations known to exist in present protective cover assemblies for electronic devices. Thus, it is apparent that it would be advantageous to provide an improved protective cover assembly directed to overcoming one or more of the limitations set forth above.

BRIEF SUMMARY OF SOME EXAMPLE EMBODIMENTS

According to one embodiment of the present invention, a protective cover assembly for an electronic device is disclosed. In one embodiment, there is disclosed a protective cover assembly comprising a porous expanded membrane having a plurality of pores, a first surface and a second surface opposite the first surface, wherein the porous expanded membrane comprises an active area and a bonded area, wherein the bonded area comprises an adhesive material that forms a bridge extending through the plurality of pores in the bonded area from the first surface to the second surface. The adhesive material may be a viscous material comprising an acrylic, polyamide, polyacrylamide, polyester, polyolefin, polyurethane, or polysilicone. In one embodiment, at least 10% of the plurality of pores in the bonded area comprise an adhesive material, preferably at least 70% of the plurality of pores in the bonded area comprise an adhesive material. In contrast, less than 1% of the plurality of pores in the active area comprise the adhesive material. In one embodiment, the adhesive material has a tan delta at $10^{-2}$ rad/s of greater than or equal to 0.4. The adhesive material may be within the membrane and does not extend beyond a plane of the first surface and/or second surface. The distance between the first surface and the second surface is less than or equal to 20 microns.

In one embodiment, the Z-strength of the expanded fluoropolymer or an expanded polyolefin membrane may be improved. The membrane may have a mass/area ratio of less than or equal to 3 $g/m^2$, preferably less than or equal to 1 $g/m^2$. In one embodiment to allow the adhesive to flow into the pores, the plurality of pores remain open when the porous expanded membranes is compressed. When the adhesive is used, the bonded area has a first peel strength that is greater than a second peel strength of the active area. In one embodiment, a first peel strength of the bonded area is greater than or equal to 1e8 Pa, preferably greater than 3e8 Pa.

In another embodiment, there is disclosed a housing having an opening therein, an acoustic transducer positioned in the housing near to the opening, and a protective cover assembly comprising a porous expanded membrane having a plurality of pores, a first surface and a second surface opposite the first surface, wherein the porous expanded membrane comprises an active area and a bonded area, wherein the bonded area comprises an adhesive material that forms a bridge extending through the plurality of pores in the bonded area from the first surface to the second surface. The first peel strength of the bonded area may be greater than a first peel strength of the active area. In one embodiment, the first peel strength of the bonded area may be greater than or equal to 1e8 Pa, preferably greater than 3e8 Pa. The porous expanded membrane, e.g., expanded fluoropolymer or an expanded polyolefin, has a mass/area ratio of less than or equal to 3 $g/m^2$, preferably less than or equal to 1 $g/m^2$.

In yet another embodiment, there is disclosed a protective cover assembly comprising a porous expanded membrane having a plurality of pores, wherein the porous expanded membrane comprises an active area and a bonded area, wherein at least 10%, preferably at least 70%, of the plurality of pores in the bonded area comprise an adhesive material. In one embodiment, less than 1% of the plurality of pores in the active area comprise the adhesive material. The adhesive material may be a viscous material comprising an acrylic, polyamide, polyacrylamide, polyester, polyolefin, polyurethane, or polysilicone. In one embodiment, the adhesive material has a tan delta at $10^{-2}$ rad/s of greater than or equal to 0.4. The adhesive material may be within the membrane and does not extend beyond a plane of the first surface and/or second surface. The distance between the first surface and the second surface is less than or equal to 20 microns.

In one embodiment, the Z-strength of the expanded fluoropolymer or an expanded polyolefin membrane may be improved. The membrane may have a mass/area ratio of less than or equal to 3 $g/m^2$, preferably less than or equal to 1 $g/m^2$. In one embodiment to allow the adhesive to flow into the pores, the plurality of pores remain open when the porous expanded membranes is compressed. When the adhesive is used, the bonded area has a first peel strength that is greater than a second peel strength of the active area. In one embodiment, a first peel strength of the bonded area is greater than or equal to 1e8 Pa, preferably greater than 3e8 Pa. The porous expanded membrane has a first surface and a second surface opposite the first surface; and the adhesive material forms a bridge from one of the first or second surface of the porous expanded membrane to the opposing surface.

In yet another embodiment, there is disclosed an electronic device comprising a housing having an opening therein, an acoustic transducer positioned in the housing near to the opening, and a protective cover assembly comprising a porous expanded membrane having a plurality of pores, wherein the porous expanded membrane comprises an active area and a bonded area, wherein at least 10%, preferably at least 70%, of the plurality of pores in the bonded area comprise an adhesive material.

These and other embodiments, along with many of their advantages and features, are described in more detail in conjunction with the below description and attached figures.

BRIEF DESCRIPTION OF THE DRAWINGS

The present invention will be better understood in view of the appended non-limiting figures.

DETAILED DESCRIPTION

Various embodiments described herein relate to a protective cover assembly for an electronic device that comprises a porous expanded membrane having improved acoustic performance and strength. In one embodiment, the protective cover assembly comprises a porous expanded membrane that is a lightweight material. The porous expanded membrane has a mass/area ratio of less than or equal to 3 $g/m^2$, e.g., less than or equal to 2 $g/m^2$, less than or equal to 1 $g/m^2$, or less than or equal to 0.5 $g/m^2$. Expanded membranes, including lightweight materials, tend to have good strength in the X and Y direction, but suffer from poor strength in the Z direction (thickness). Poor Z-strength may result in delamination and tears in the membrane. Because processing membranes into piece parts typically proceeds via die cutting, as well as some end use criteria (peel propagation due to high pressure water challenge), involve membrane rarefaction forces through the Z direction, reinforcement of the membrane's Z-strength is desirable to prevent delamination. Thus, these lightweight materials, despite their acoustic performance, have not been used as protective covers due to the deficiencies in Z-strength.

To overcome the limitations of lightweight materials, the present inventors have found that in one embodiment forming an adhesive bridge in an bonded area of the membrane improves the Z-strength without compromising the acoustic performance in the active area. An adhesive bridge or simply a bridge refers to a continuous path of adhesive from one surface to the opposing surface of a membrane. The adhesive bridges extends through the porous void space ("pores") of the membrane. Thus, in one embodiment there is provided protective cover assembly comprising a porous expanded membrane that comprises an active area across an acoustic pathway and a bonded area for adhering the membrane to an electronic device or the housing of the electronic device. The bonded area comprises an adhesive material that forms one or more bridges extending through the plurality of pores in the bonded area from the first surface to the second surface. To prevent acoustic interference the adhesive bridges is in the bonded area and is not present in the active area. Stated differently, the area for the adhesive bridge may define the bonded area and the remaining area without adhesive may define the active area. It should be understood that due to the porous nature of the membrane, there may be several adhesive bridges. The Z-strength performance is demonstrated by an increase in peel strength and this provides reinforcement allowing lighter weight materials to be used alone without a support layer.

Another approach to improve Z-strength according to the disclosed embodiments is that at least some of the pores in the bonded area comprise an adhesive material. Having at least some adhesive materials in the pores, without necessarily forming a bridge, may be beneficial to improve Z-strength. Thus, in another embodiment there is provided a protective cover assembly comprising a porous expanded membrane having a plurality of pores, wherein the porous expanded membrane comprises an active area and a bonded area, wherein at least 10% of the plurality of pores in the bonded area comprise an adhesive material. In another embodiment, the adhesive fills at least 20% of the pores in the bonded area, e.g., at least 30% or at least 50%. To adhere the membrane, the adhesive material should be present along the opposing surfaces. In a further embodiment, the filling of the adhesive material in the pores may create an adhesive bridge.

One measure of the bonded area's integrity is a high peel strength that is associated with an improved Z-strength. Surprisingly, it has been found that the porous expanded membranes having adhesive present or an adhesive bridge as described herein have high Z-strength in the thickness direction and thus have increased resistance. Peel strength may be used to determine the Z-strength. The active area, due to the absence of adhesive, has a lower Z-strength relative to the bonded area. In one embodiment, it may be useful that the protective cover assembly has a Z-strength greater than or equal to 1e8 Pa in the bonded area when tested according to the method described herein. In other embodiments, the Z-strength of the bonded area is greater than or equal to 1e8 Pa, e.g., greater than 3e8 Pa, greater than 5e8 Pa, or between 1e8 Pa and 1e10 Pa when tested according to the method described herein. In contrast the Z-strength of the active area is low and may be less than 1e8 Pa in the active area, when tested according to the method described herein. Thus, the peel strength of the bonded area is greater than the peel strength of the active area.

In addition to the increase in strength, the membrane has an active area that is not filled with an adhesive. The active area has good acoustic performance. In one embodiment, the transmission loss in the active area is less than 3 dB at a frequency from 50 Hz to 20 KHz.

Prior methods that sought to increase strength of the membrane involved imbibing isotropic polymers into the membrane pores. Although this can increase the strength, there are a number of problems. The imbibing caused a reduced airflow. Further, there was an increased sensitivity to external stresses due to elastomeric behavior of the imbibed isotropic polymer. Thus, the imbibing is not desirable to increase the strength of membranes. The adhesive penetration and adhesive bridges are different because it is not associated with reduced airflow and is more resistant to external stresses.

Porous Membranes

The porous expanded membranes described herein may be expanded fluoropolymers, such as expanded polytetrafluoroethylene (ePTFE), or expanded olefins, such as expanded polyethylene or expanded polypropylene. Other fluoropolymers may include polyvinylidene fluoride ("PVDF"), tetrafluoroethylene-hexafluoropropylene copolymer ("FEP"), tetrafluoroethylene-(perfluoroalkyl) vinyl ether copolymer ("PFA"), or the like, may be used because similar to ePTFE these fluoropolymers are hydrophobic, chemical inert, temperature resistance, and have good processing characteristics. To provide the necessary protection the porous expanded membranes should be resistant to moisture and other liquids. In one embodiment, the porous expanded membranes are hydrophobic, but may be hydrophilic by adding a coating or layer. At the same time the porous expanded membranes allow air to pass through without a significant sound attenuation. In one embodiment, ePTFE membranes are described in US Pub. No. 2007/0012624 and U.S. Pub. No. 2013/0183515, the entire contents and disclosure of which is hereby incorporated by reference, may be used. Suitable membranes may have a high strength and small pore size. Other highly fibrillated membranes may also be used. To make the membrane less conspicuous, one surface of the membrane may be subjected to a coloring treatment.

As described above, the embodiments described herein use a lightweight porous expanded membrane having mass/area ratio of less than or equal to 3 g/m². When the mass/area ratio exceeds 3 g/m², the heavier membranes tend to have sufficient Z-strength and the presence of an adhesive material in the bonded area or a bridge does not further enhance the Z-strength. However, heavier membranes lack the acoustic properties of lighter weight materials. When the lightweight membranes described herein are used there is significant improvement in Z-strength due to the presence of an adhesive material or adhesive bridge. In terms of ranges the lightweight membranes may have a mass/area ratio from 0.2 to 3 g/m², e.g., from 0.2 to 2 g/m², from 0.2 to 1 g/m², or from 0.2 to 0.5 g/m². The mass/area ratio is determined prior to adding the adhesive or forming the adhesive bridge. The active area of the membrane retains the mass/area ratio of the original membrane. One beneficial characteristic of lightweight membranes suitable for the embodiments disclosed herein is the ability to be compressed or crushed without pore closures or densification. This allows the adhesive material to penetrate into the pores when the membrane is compressed and avoid pore collapse. Compression, along with heat, may be used to flow the adhesive material into the pores.

Along with the lightweight properties, the porous membranes may also be thin. This allows the membranes to be used in electronic devices having a small profile. In one embodiment, the porous membranes have a thickness measured from the first surface to the opposing surface, i.e. second surface, is less than or equal to 20 microns, e.g., less than or equal to 10 microns, less than or equal to 5 microns, less than or equal to 2 microns, less than or equal to 1 microns. A thinner membrane is advantageous to allow the adhesive material to penetrate the bonded area and create an adhesive bridge. A thinner membrane also contributes to good acoustic performance. Thicker membranes may be used with more vicious adhesives or manufacturing process that use high temperature and pressure force the adhesive into the bonded area.

In addition to the thinness and lightweight properties, the membranes also have properties that are suitable for transmission of sound while preventing water intrusion. The membrane may have a very open structure that can have a wide range of pore sizes. A nominal pore size of such membranes may be in the range from 0.05 to 5 μm, e.g., from 0.05 to 1 μm. The pore volume may be in the range of 20 to 99 percent, e.g., preferably in the range of 50 to 95 percent. In one embodiment, the membrane may be a microporous membrane that is a continuous sheet of material that is at least 50% porous (i.e., having a pore volume 50%) with 50% or more of the pores being no more than 5 μm in nominal diameter. The air permeability may be in the range from 0.15 to 50 Gurley-seconds, e.g., from 1 to 10 Gurley-seconds. The water entry pressure resistance may be in the range from 5 to 200 psi, e.g., from 20 to 150 psi. Long-term water entry pressure of these membranes may have a duration of greater than 0.5 hours at 1 meter of water pressure, e.g., greater than 4 hours at 1 meter of water pressure.

As proposed by others a backing or support layer is often laminated to the membrane to provide mechanical strength to the porous expanded membrane. However, when used in applications demanding good acoustic performance, the backing or support layer may cause high sound attenuation or distortion, adds thickness, and provides strength in the Z direction for the membrane. The decrease sound performance due to the support layer is undesirable in most applications and limits the advantages of using the lightweight porous expanded membranes. Even without the backing or support layer, the presence of adhesive material in the bonded area, in particular the adhesive bridges, provides sufficient Z-strength to render the backing or support layer unnecessary. Without a backing layer the membrane may be adhered directly to gaskets, housing, or substrates. This reduces the over thickness and provides better acoustic performance.

A captive construction that uses two external adhesive support systems is not suitable for lightweight membranes disclosed herein because it fails to provide Z-strength. As the membrane mass/area decreases to less than or equal to 3 g/m², the adhesive support systems of captive construction cannot provide the necessary Z-strength for the lightweight membranes. In addition, there is very little penetration of adhesive material into the pores in a captive construction, e.g. less than 10%, and the adhesive support system remains external to the membrane. Thus, due to low adhesive penetration, an adhesive bridge cannot be formed with captive constructions.

Adhesive Materials

The adhesive materials used in the embodiments described herein may be from the class of acrylics, polyamides, polyacrylamides, polyesters, polyolefins, polyurethanes, polysilicones and the like. To allow the adhesive material to penetrate the pores of the membrane, adhesives with a tan delta (the ratio of viscous modulus (G") to elastic modulus (G')) value at $10^{-2}$ rad/s of greater than or equal to 0.4, e.g., greater than or equal to 0.42, greater than or equal to 0.44, greater than or equal to 0.46, or greater than or equal to 0.5. In terms of ranges, the tan delta at $10^{-2}$ rad/s may be from 0.4 to 0.8, e.g., from 0.42 to 0.65. More rigid adhesives with tan delta at $10^{-2}$ rad/s of less than 0.2 are to be avoided because it is difficult to achieve adhesive penetration without high heat and/or pressure. In particular, acrylics and polysilicone adhesives have high tan deltas and low viscosity and are suited for the embodiments disclosed herein.

In one embodiment, the adhesive has philic properties that encourages wicking into the pores and through the membrane to form adhesive bridges. The adhesive material may have a surface energy of 50 or more Dynes/cm, e.g., 65 or more Dynes/cm, or 70 or more Dynes/cm. The membrane may also be hydrophilic or coated to increase the hydrophilic properties of the membrane.

It is surprising that these types of adhesive materials penetrate into the porous expanded membrane because these membranes are typically resistant to moisture intrusion and other fluids having a low surface tension such as oils. In one embodiment the adhesive materials may be pressure-sensitive adhesives such as acrylics or polysilicones. Double-sided pressure-sensitive tapes may be used as the layer that flows into the pores of the membrane. Pressure-sensitive adhesives have good peel strength. Heat or UV curable adhesives that are viscous prior to being cured may also be used.

The adhesive materials penetrate the pores of the membrane's bonded area and may create an adhesive bridge. The adhesive bridge extends from one surface of the membrane to the opposing surface and the adhesive material is present on the surface. This allows the adhesive bridge to adhere the membrane to the electronic device or housing.

Protective Cover Assemblies

The protective cover assembly permits sound energy to pass through with minimal attenuation while maintaining improved Z-strength performance. The membrane comprises a bonded area and an active area. The bonded area has pores in which the adhesive material penetrates, and there may be one or more adhesive bridges between the opposing surfaces. The active area is in the acoustic pathway and allows the passage of sound. The Z-strength of the active area is lower than the bonded area. In one embodiment, the membrane is circular in shape and the bonded area may surround the active area to create a frame. Although the Z-strength is not improved in the active area, due to the frame of the bonded area the porous membrane does not experience delamination. In general, for most applications, it is preferred that the area of the bonded area be minimized, to the extent permitted by the mechanical and acoustic requirements of the protective cover assembly, and the active area be maximized.

Figure 1:
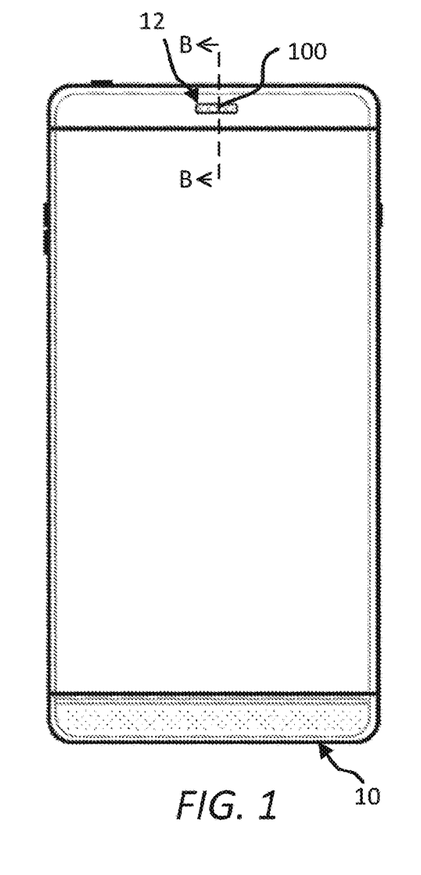
FIG. 1 shows a front view of an electronic device having a protective cover assembly in accordance with the embodiments disclosed herein.

FIG. 1 shows an external front view of an electronic device 10, which is represented as a cellular phone, having a small opening 12. The opening may be a narrow slot or a circular aperture. Although one opening 12 is shown, it should be appreciated that the number, size and shape of openings in the electronic device 10 may vary. In one embodiment, the maximum diameter of the opening 12 is from 0.1 mm to 500 mm, e.g., from 0.3 mm to 25 mm, or from 0.5 mm to 13 mm. The protective cover assembly 100 is shown covering the opening 12 to prevent intrusion of moisture, debris or other particles into the electronic device 10. The protective assembly cover 100 is suitable for any size of opening and is not particularly limited. Structures disclosed herein may apply equally to openings for sound passage in the protective covers of any comparable electronic device, such as laptop computers, tablets, cameras, portable microphones, or the like. To allow the protective cover assembly 100 to be mounted the size of the protective cover assembly is greater than maximum diameter of the opening. The transducer 18, shown in FIG. 4, for generating or receiving sound is disposed beneath the opening 12 so that the protective cover assembly 100 covers the transducer 18.

Figure 2:
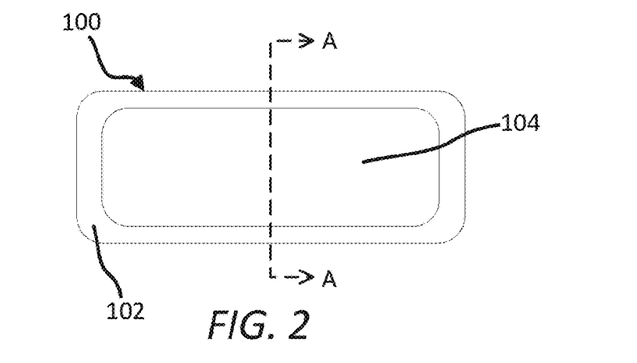
FIG. 2 shows a top view of a protective cover assembly in accordance with the embodiments disclosed herein.
Figure 3:
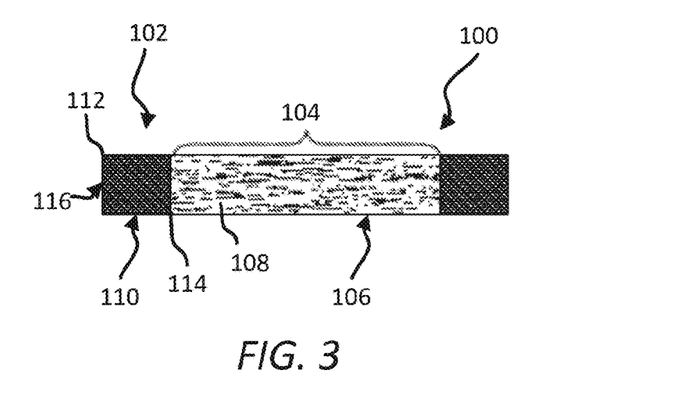
FIG. 3 shows a cross-sectional view of the protective cover assembly in FIG. 2 taken along line A-A.

Protective cover assembly 100 is shown in more detail in FIGS. 2 and 3. As shown, the protective cover assembly 100 includes a porous expanded membrane 106 that has a bonded area 102 surrounding an active area 104. The porous expanded membrane 106 has a plurality of pores 108. As discussed herein, the porous expanded membrane 106 is lightweight and has a mass/area ratio of less than or equal to 3 g/m$^2$. The structure of the expanded membrane 106 may be an interconnected matrix or structure of nodes and/or fibrils. The structure of the membrane 106 should allow pores 108 to be dependent on each other. Independent pores, i.e. ones that are not connected, may be present but are not suitable for air flow or adhesive penetration. Porous expanded membranes having highly fibrillated structures may also be used. An adhesive material 110 is present within the pores of the bonded area 102 and extends from a first surface 112 to a second surface 114. This adhesive material 110 may form one or more adhesive bridges 116 through the bonded area 102.

Figure 4:
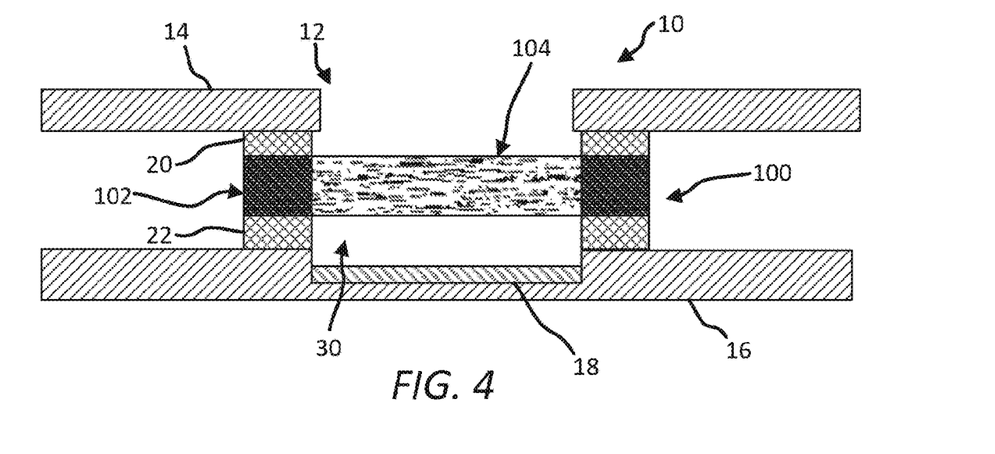
FIG. 4 shows a cross-sectional view of the protective cover assembly within the housing of the electronic device in FIG. 1 taken along line B-B.

FIG. 4 shows a cross-sectional view of the protective cover assembly 100 within the electronic device 10. The opening 12 is shown in housing 14 and protective cover assembly 100 is positioned across the acoustic cavity 30 to cover the transducer 18. Transducer 18 may be mounted on a substrate 16. In one embodiment, the transducer 18 can be a microphone or other acoustic sensor, a speaker, a pressure sensor, or other comparable type of sensor. Transducer 18 may be a micro-electric mechanical (MEMs) device, such as a microphone, acoustic sensor or acoustic speaker. Further, although one transducer 18 is shown in FIG. 4, there may be one or more transducers. Substrate 16 may be an electronic circuit board, for example, a flex circuit board or other suitable material.

Figure 5:
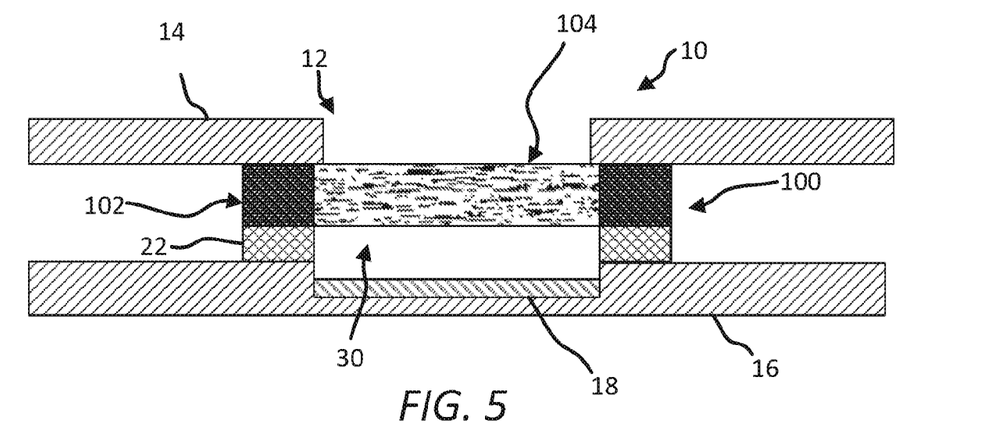
FIG. 5 shows a cross-sectional view of the protective cover assembly mounted directly to the housing of the electronic device in FIG. 1 taken along line B-B.

As shown in FIG. 4, an upper gasket material 20 connects the protective cover assembly 100 with the housing 14 and a lower gasket material 22 connects the protective cover assembly 100 with the substrate 16. The distance between the active area 104 and transducer 18 may define the acoustic cavity 30. This distance may be adjusted by adjusting a thickness of the lower gasket 22, or by the topology of the substrate 16 which may be depressed or raised at the transducer 18. The housing 14 may be a plastic or metal case. The housing 14 may be sealed to prevent intrusion of water, debris or particles. Because the adhesive material 110 is in the pores 108 of the porous expanded membrane 106 at the bonded area 102, the protective cover assembly 100 may also be directly adhered to the housing 14 via the adhesive material at the bonded area, as shown in FIG. 5. In another embodiment, the protective cover assembly may be directly adhered to the substrate 16, or may be directly adhered to both the substrate and to the housing 14 without necessitating gasket layers 20, 22.

Acoustic waves may be passed through the acoustic cavity 30 and through the membrane 106 in the active area 104 between the transducer 18 and an external environment outside of the housing 14. This may define an acoustic pathway, with the active area 104 traversing the acoustic pathway. The acoustic pathway may also provide venting. Venting provides for pressure equalization between an acoustic cavity and an environment outside of the acoustic cavity, such as an interior environment of a housing containing an acoustic device, or an exterior environment. Venting is useful when pressure differences arise during use of the electronic device 10 that affect the ability of the protective cover assembly 100 to pass acoustic waves. For example, a temperature change in the acoustic cavity 30 may cause an expansion or contraction of air within the acoustic cavity, which would tend to deform the protective cover assembly 100, particularly in the active area 104, and cause acoustic distortion. By providing a porous or microporous material for the active area 104, the protective cover assembly 100 can be made capable of passing air therethrough in order to equalize pressure. The equilibration rate of the protective cover assembly may be sufficiently high to allow air to enter or leave the acoustic cavity via venting to substantially prevent or mitigate such distortion. In addition, the increase in Z-strength provides resistance to distortion.

Although shown aligned in FIGS. 4 and 5, the active area 104 may be smaller or larger than the acoustic pathway and a portion of the bonded area 102 may partially extend into the acoustic pathway. In one embodiment, to provide a sufficient acoustic cover, a minimum diameter of the active area 104 is at least equal to or greater than a maximum diameter of the opening 12. Having such a size relationship allows the protective cover assembly 100 to fully traverse the acoustic pathway and prevent intrusion of fluid or moisture into the acoustic cavity 30 and further into electronic device 10. The acoustic transmission passes through the Z direction of the membrane 106.

In one embodiment, the total thickness of the protective cover assembly 100 and gaskets 20, 22 may be from 0.1 μm to 6 μm, e.g., from 0.1 μm to 3 μm. Without being limiting, in some exemplary applications, a protective cover assembly may be used in combination with a MEMS transducer having comparably small thickness, e.g., on the order of 100 μm to 1000 μm. Thus, an electronic device incorporating the protective cover assembly 100 may be very thin such as from 0.2 to 1.2 mm, which is suitable for inclusion in many small form factor applications, such as handheld electronic devices.

Conventional commercially-available materials are known in the art and are suitable for use as the lower and upper gasket materials. For example, soft elastomeric materials or foamed elastomers, such as silicone rubber and silicone rubber foams, can be used. A preferred gasket material is a microporous PTFE material, and more preferably, a microporous ePTFE having a microstructure of interconnected nodes and fibrils, as described in U.S. Pat. Nos. 3,953,566; 4,187,390; and 4,110,392; which are incorporated herein by reference. Most preferably, the gasket material comprises a matrix of microporous ePTFE which may be partially filled with elastomeric materials. Gasket material may be adhered by the adhesive in the pores of the porous expanded membrane and may also be bonded to the housing and/or substrate.

Other suitable gasket materials include thermoplastic elastomer include styrene-based thermoplastic elastomers (SBC), olefin-based thermoplastic elastomers (TPO), vinyl chloride-based thermoplastic elastomers (TPVC), urethane-based thermoplastic elastomers (TPU), ester-based thermoplastic elastomers (TPEE), and amide based thermoplastic elastomers (TPAE). Specific examples include styrene-butadiene-styrene block copolymers (SBS), styrene-isoprene-styrene block copolymers (SIS), ethylene vinyl acetate elastomers (EVA), polyamide elastomers, and polyurethane elastomers.

Surprisingly, lightweight membranes described herein have a mass/area ratio of less than or equal to 3 g/m$^2$ while exhibiting sufficient Z-strength to resist bursting under pressures caused by fluctuating exterior pressure and/or fluctuating temperature within the acoustic cavity. This feature runs contrary to conventional designs, which utilize thicker and/or heavier membranes. Further, the thinner membranes minimally obstruct acoustic energy, enabling them to demonstrate better acoustic performance.

Figure 6:
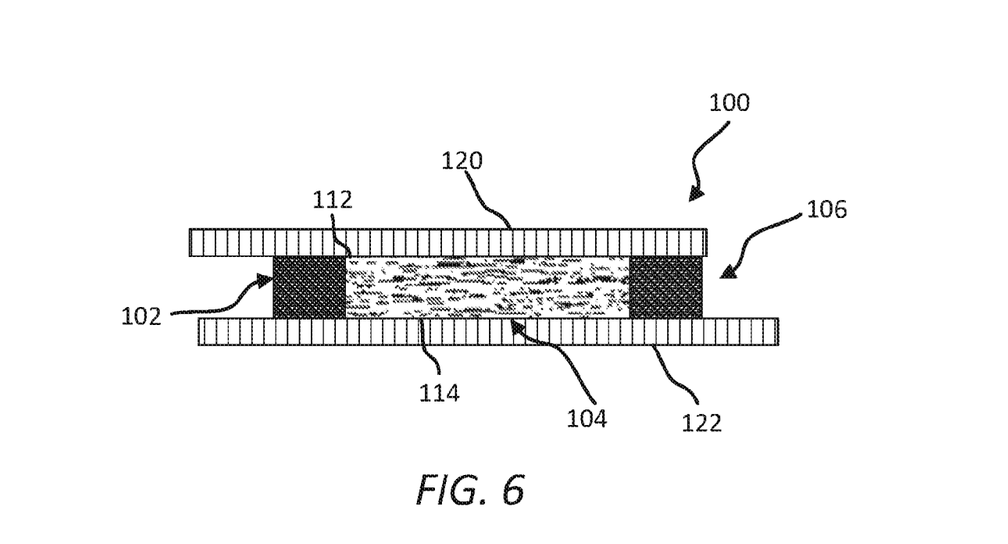
FIG. 6 shows a cross-sectional view of the protective cover assembly having a releasable liner in accordance with the embodiments disclosed herein.

As mentioned above, the improved Z-strength is also beneficial in the processing steps for making and assembling the protective cover assembly 100. Often a releasable liner is used with an acoustic membrane, as shown in FIG. 6, e.g., releasable liners 120, 122 may be employed to temporarily and removably adhere to the bonded area 102 of the protective cover assembly 100 before the protective cover assembly is assembled with an electronic device. Releasable liners 120, 122 may provide protection to the protective cover assembly 100, provide protection to a part to which the protective cover assembly is adhered, enable easier handling of the part, or for other comparable reasons. Bonded area 102 includes adhesive material 110, which can be used to adhere the protective cover assembly 100 to the liner, thus obviating the need for additional adhesives along the surface of the liner. Thus, because the liner is not adhered to the active area 104, the removal of the releasable liner from the protective cover assembly 100 does not cause rupture in the active area despite the active area having relatively lower Z-strength compared with the bonded area 102. A releasable liner may be made from ethylene vinyl acetate elastomers (EVA), silicone materials, polyethylene terephthalate or similar materials.

In one embodiment, a top liner 120 is adjacent to the first surface 112 of membrane 106, and a bottom liner 122 is adjacent to the second surface 114 of the membrane 106. The top liner 120 and bottom liner 122 may be joined to the membrane 106 by the adhesive in the bonded area 106. Liners are often used to cover the membrane 106 prior to be placed in the electronic device. The liners 120 and 122 are removed by peeling in a direction away from membrane 106 that increases stress in the Z-direction. Reducing the tears or ruptures during the manufacturing is desirable to avoid waste. By having adhesive penetrating into the pores and/or an adhesive bridge in the bonded area 102, the Z-strength is increased to prevent tears or ruptures throughout the membrane 106.

Processes for creating the adhesive bridge are shown in FIGS. 7 and 8. FIGS. 7A-7D show a process for creating an adhesive bridge by merging adhesive layers 140, 142 on opposing sides of the membrane 106; and FIGS. 8A-8D show a process for creating an adhesive bridge from one side by merging adhesive layer 140 into the membrane on one side. Heat and/or pressure may be used to flow the adhesive material from the layer(s) 140, 142 into the pores of the membrane 106. In one embodiment, the layers 140, 142 are heated to a temperature above a melting or flow point of the adhesive material, but not more than 175° C., e.g., not more than 150° C. The membrane 106 is sufficiently heat resistant to withstand the heated temperatures. In addition to temperature, the adhesive material from layers 140, 142 may penetrate into the pores upon application of a pressure of greater than 150 kPa, e.g., greater than 300 kPa. A roller or plate may apply the pressure to the layer 140. The membrane 106 is sufficiently resilient to the application of pressure such that the pores remain open at higher pressures of up to 1500 kPa, e.g., up to 500 kPa, so that the porosity of the active area 104 is maintained, and so that the pores of the bonded area 102 remain open to receive the adhesive material. In one specific embodiment, the adhesive material may penetrate into the pores by applying a temperature from 50° C. to 175° C. and pressure from 150 kPa to 500 kPa. In other embodiments, the adhesive material is sufficiently viscous to flow into the pores without added heat or with reduced heat and/or without added pressure or under reduced pressure.

Due to the increased heat and temperature, some membranes experience compression of the pores that prevents adhesive penetration. The lightweight membranes disclosed herein having a mass/area ratio of less than or equal to 3 g/m$^2$ are sufficiently resistant to compression, thus allowing the pores to remain open for adhesive to penetrate therein. Further, the membrane material should be thermally resistant to avoid deformation of the structure.

Figure 7A:
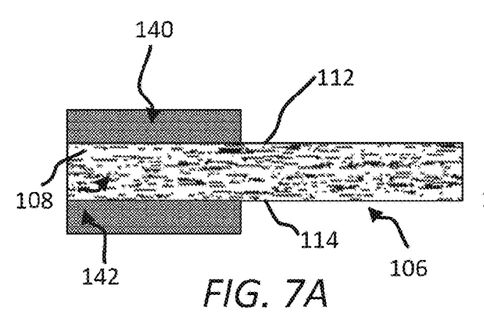
FIGS. 7A-7D show detailed cross-sectional views of processing steps for the adhesive material penetrating the pores of the bonded area from two opposing surfaces in accordance with the embodiments disclosed herein.
Figure 7B:
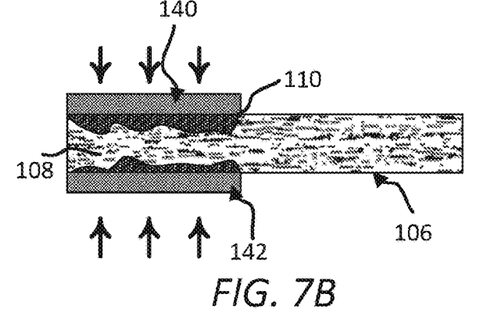
Figure 7C:
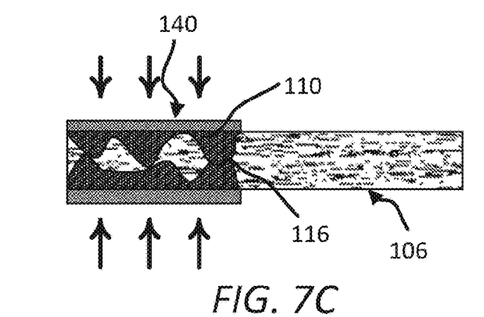
Figure 7D:
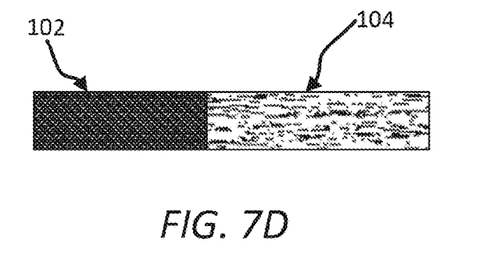

Starting with FIG. 7A, layers 140, 142 of adhesive material are placed adjacent to the first surface 112 and second surface 114 of the membrane 106. In one embodiment, layers 140, 142 are double-side pressure sensitive adhesives. Because no backing layer is used, the layers 140, 142 are directly adjacent to the membrane 106. As indicated by the arrows in FIG. 7B, heat and/or pressure are applied to promote the penetration of the adhesive material 110 into the pores 108 of membrane 106. Upon continued application of heat/pressure, the adhesive material 110 continues to penetrate and begins to form a bridge 116 as shown in FIG. 7C. The adhesive material 110 continues to flow into the pores 108 until layers 140, 142 are no longer extending past the plane of surfaces 112 and 114. Once the adhesive material 110 is within the pores 108, a bonded area 102 is created and the Z-strength of the membrane 106 is enhanced. The area without the adhesive is represented as the active area 104. In one embodiment, at least 10% of the pores in the bonded area contain the adhesive material, e.g., at least 20% of the pores contain the adhesive material, at least 30%, or at least 50%, or at least 70%. Generally, having less than 10% of pores containing the adhesive material does not improve the Z-strength of the lightweight membrane. Increasing the amount of adhesive may further enhance the strength of the membrane in the Z direction. Due to the presence of the adhesive, the bonded area may be significantly less conductive of acoustic waves; instead, the acoustic waves are directed through the active area.

In one embodiment, layers 140 and 142 comprise the same type of adhesive material. However, the present invention contemplates using different types of adhesive on the opposing surfaces.

FIG. 7A, prior to adhesive penetration, is similar to a conventional captive cover where the adhesive layers would remain adhered to the surface of the porous membrane. The captive construction does not provide the necessary reinforcement without increasing the weight of the membrane or providing a backing layer. The assembly would remain a captive construction when the adhesive material is too rigid and does not flow into the pores. The confluence of the adhesive material as shown in FIGS. 7B and 7C forms one or more adhesive bridges that further reinforces the membrane and provides increase Z-strength.

Although it is preferred to have adhesive material in the pores of the bonded area, there may be slight lateral penetration of the adhesive material into less than 1 of the pores of the active area. This can be minimized by controlling the heat and pressure applied to the layer comprising the adhesive material.

In one embodiment, the adhesive material penetrates into the bonded area when after being placed into the electronic device and this is referred to an in-situ formation of the bonded area. In other embodiments, the bonded area may be created before placing the protective assembly into the electronic device.

In one embodiment the adhesive material is heat curable and the heat applied to cause the confluence of the adhesive material may be less than the curing temperature. Once the adhesive material is penetrated into the porous membrane the adhesive material may then be cured.

Figure 8A:
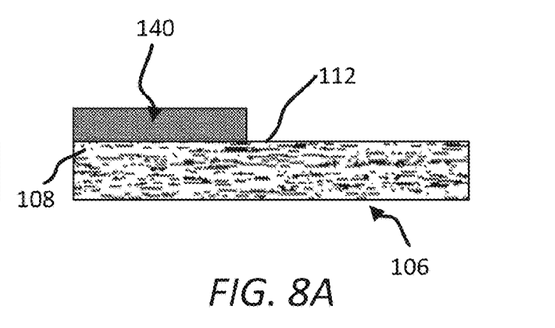
FIGS. 8A-8D show detailed cross-sectional views of processing steps for the adhesive material penetrating the pores of the bonded area from one surface in accordance with the embodiments disclosed herein.
Figure 8B:
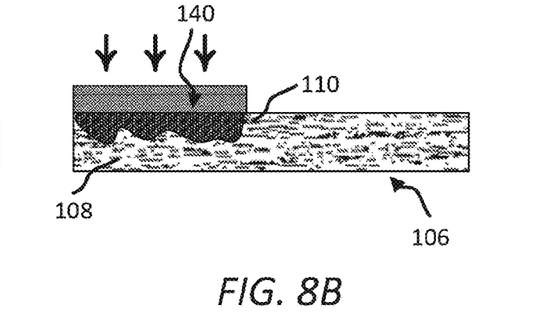
Figure 8C:
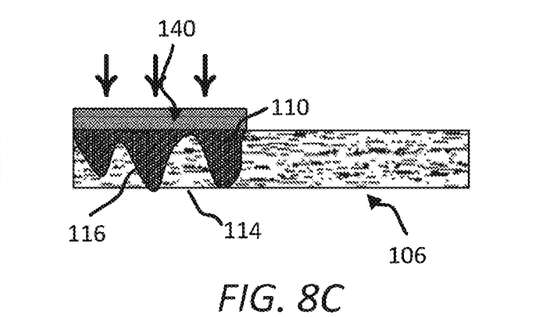
Figure 8D:
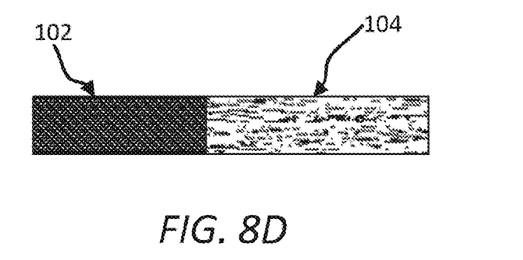

A similar process is shown in FIGS. 8A-8D, except that the layer 140 is placed on first surface 112. Heat and pressure is applied on one surface of the membrane 106. Bridges 116 from once adhesive material 110 reaches surface 114 as shown in FIG. 8C.

In an alternative embodiment, the bonded area may have macro passageways through the membrane with opening on each surfaces. The macro passageways may be formed by needle puncturing or a similar process. The size of the macro passageway is greater than the pores of the membranes, e.g., greater than 100 μm. The adhesive material may penetrate and fill the macro passageways to create the adhesive bridges. The passageways create definable bridges and can control the location and number of the bridges. Because the pores are also present the adhesive material may also enter into the pores.

The present invention will be better understood in view of the following non-limiting examples and test results.

Test Methods

Insertion Loss Detection Test

Insertion loss can be detected by connecting a membrane under test with an orifice of a sample holder plate, fully encasing the assembly, and measuring sound generated by a speaker after passing through the orifice and the assembly.

Each sample was formed into a circular acoustic cover having an inner diameter ("active area") of 1.6 mm, and placed over a circular aperture of 1 mm diameter on a sample holder plate. The sample was placed inside a B&K type 4232 anechoic test box at a distance of 6.5 cm from an internal driver or speaker. A Knowles® SPA2410LR5H MEMS measurement microphone was used.

The speaker was excited to produce an external stimulus at 1 Pa of sound pressure (94 dB SPL) over the frequency range from 100 Hz to 11.8 kHz. The measurement microphone measured the acoustic response as a sound pressure level in dB over the frequency range. Measurements were obtained with the aperture uncovered, i.e. with no sample present, for calibrating the loss detection test. Measurements were obtained by introducing each respective example as the sample.

ATEQ Airflow Test

ATEQ Airflow is a test method for measuring laminar volumetric flow rates of air through membrane samples. For each example, a sample was produced in membrane form having an area of 2.0 cm$^2$. The samples were clamped between two plates in a manner that seals the sample across a flow pathway. An ATEQ Corp. Premier D Compact Flow Tester was used to measure airflow rate (L/hr) through each acoustic membrane sample by challenging it by a differential pressure of 1.2 kPa (12 mbar) of air pressure through the flow pathway.

Water Entry Pressure (WEP) Test

WEP was determined in similar manner to the ATEQ airflow test by subjecting the samples in a test assembly to water with differential pressures of 34.5 and 500 kPa across a flow pathway.

Bubble Point Test

Bubble point was determined via a Capillary Flow Porometer, CFP-1500, made by Porous Materials Inc.

Thickness

Samples were measured using a Keyence LS-7010M digital micrometer.

Z-Strength

The Z-strength of the membranes was measured per TAPPI T-541 om-05 with the following modifications. The sample area was 0.713 cm$^2$ and a crosshead speed of 0.67 cm/sec was used. While samples were not conditioned prior to testing per TAPPI protocol, samples were heated at 49° C. for 20 minutes while held under 255 kPa of pressure to ensure good adhesion between the double sided tape (3M™ Very High Bond ("VHB") tape) and sample. Three samples were tested with the average maximum stress reported as the Z-strength.

Mass Per Area

The mass per area of samples was measured according to the ASTM D 3776 (Standard Test Methods for Mass Per Unit Area (Weight) of Fabric) test method (Option C) using a Mettler-Toledo Scale, Model 1060. The scale was recalibrated prior to weighing specimens, and the results were reported in grams per square meter (g/m$^2$).

Example

Example 1

A porous expanded polytetrafluoroethylene having a mass/area ratio of 1.4 g/m2, bubble point of 31.1 kPa (4.6 psi), ATEQ of 763 L/hr, water entry pressure of 49.9 kPa (7.25 psi), and thickness of 16 μm. Three different adhesive materials: Nitto 5610R—double sided acrylic adhesive with a polyester film; Nitto 5610 BN—double sided an acrylic adhesive; and an acrylic adhesive TPA107 (Tesa, 4972), were tested to determine whether the adhesive would penetrate into the membrane pores at different pressures (0, 500 kPa, and 1500 kPa). Adhesive-Membrane-Adhesive stacks as shown in FIG. 7A were clamped between 2 flat plates for a minimum of 5 seconds. Compressive force was measured by an Instron machine. All testing and sample preparation was performed at room temperature. The peel strength of the membrane was measured after the application of the compressive force. Table 1 shows the results.

TABLE 1

| | 1 inch T Peel Force (kgf) | | |
|---|---|---|---|
| Pressure (kPa) | 5610R | 5610BN | TPA107 |
| 0 | 0.06 | 0.1 | 0.16 |
| 500 | 0.17 | 0.23 | 0.27 |
| 1500 | 0.29 | 0.8 | 0.55 |

As shown in Table 1 none of the adhesives showed flow into the pores and had low peel strength. At 500 kPa, the more viscosity adhesives 5610BN and TPA107 flowed into the pores and demonstrated peel strengths indicative of good Z-strength. At high pressure of 1500 kPa all three adhesives penetrated the pores. Even at these high pressures the membrane was resistant to the compressive force and the pores remained sufficiently open.

Example 2

Using a similar membrane and testing configuration of Example 1, an adhesive 5605BRN (Nitto Denko) was tested at various operating pressures and temperatures as reported in Table 2. None of these samples were shown to have flow through in Example 2.

TABLE 2

| | 5605BRN | | |
|---|---|---|---|
| | 1-inch T-Peel Force, kgf | | |
| Pressure, kPa | 25° C. | 100° C. | 150° C. |
| 300 | 0.05 | 0.13 | 0.12 |
| 350 | 0.05 | 0.13 | 0.12 |
| 400 | 0.05 | 0.14 | 0.12 |

Example 3

Using a similar membrane and testing configuration of Example 1, an adhesive 5605BN (Nitto Denko) was tested at various operating pressures and temperatures as reported in Table 3. At room temperature, 25° C., flow through was present at the higher pressure of 400 kPa, and no flow through was determined at the lower pressures. At higher temperatures, 100° C. and 150° C., there was flow through at each pressure.

TABLE 3

| | 5605BN | | |
|---|---|---|---|
| | 1-inch T-Peel Force, kgf | | |
| Pressure, kPa | 25° C. | 100° C. | 150° C. |
| 350 | 0.17 | 0.4 | 0.48 |
| 400 | 0.13 | 0.4 | 0.65 |
| 300 | 0.31 | 0.38 | 0.28 |

Example 4

Using a similar membrane and testing configuration of Example 1, an adhesive TPA107 (Tesa 4972) was tested at various operating pressures and temperatures as reported in Table 4. There was sufficient flow through at each tested pressure and temperature.

TABLE 4

| | TPA107 | | |
|---|---|---|---|
| | 1-inch T-Peel Force, kgf | | |
| Pressure, kPa | 25° C. | 100° C. | 150° C. |
| 350 | 0.38 | 0.5 | 0.5 |
| 400 | 0.42 | 0.5 | 0.47 |
| 300 | 0.41 | 0.45 | 0 |

Example 5

Using a similar membrane and testing configuration of Example 1, an adhesive TPA107 (Tesa 4972) was tested at various operating pressures and temperatures as reported in Table 4. There was sufficient flow through at the higher temperatures, 100° C. and 150° C., but no flow through at room temperature (25° C.).

TABLE 5

| | 5610BN | | |
|---|---|---|---|
| | 1-inch T-Peel Force, kgf | | |
| Pressure, kPa | 25° C. | 100° C. | 150° C. |
| 300 | 0.17 | 0.31 | 0.38 |
| 350 | 0.17 | 0.4 | 0.48 |
| 400 | 0.13 | 0.4 | 0.65 |

Example 6

Figure 9:
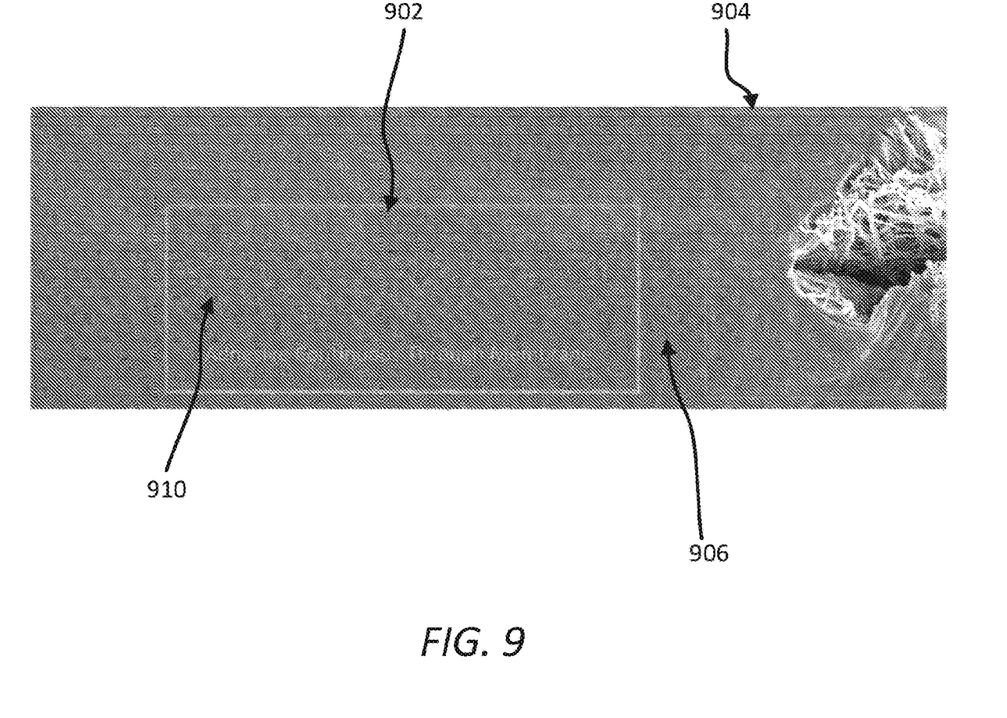
FIG. 9 is a SEM image of a protective cover having adhesive in the bonded area in accordance with embodiments disclosed herein.

SEM images were also taken of membranes to inspect the adhesive flow through and Z-strength. FIG. 9 illustrates a membrane 906 having an adhesive material 910 in bonded area 902 and no adhesive material in active area 904. The membrane is a porous expanded polytetrafluoroethylene having a mass/area ratio of 0.5 g/m$^2$, bubble point of 351.6 kPa (51.0 psi), ATEQ of 110 L/hr, and thickness of 3.2 μm. The adhesive material is TPA 107 (Tesa 4972). To illustrate the problem with delamination due to low Z-strength the bonded area was placed one end of the membrane. Delamination occurred in the active area, but not the bonded area. Further the surface of the bonded area was able to adhere the membrane into an electronic device.

Example 7

Figure 10:
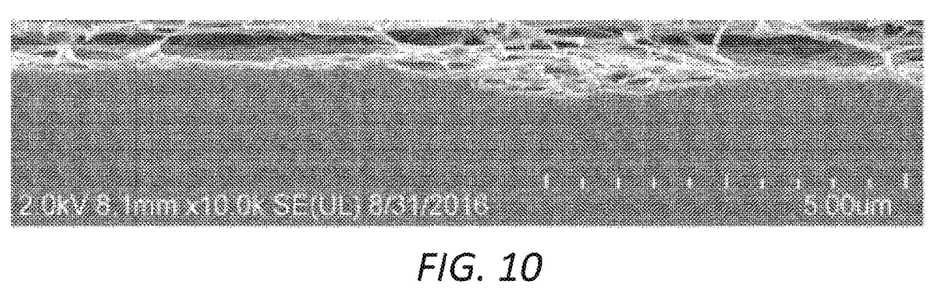
FIG. 10 is a SEM image of the bonded area of a protective cover having adhesive without a heat treatment step in accordance with embodiments disclosed herein.
Figure 11:
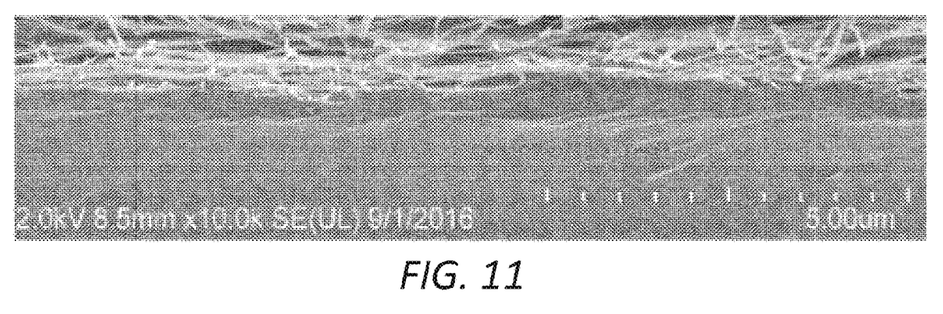
FIG. 11 is a SEM image of the bonded area of a protective cover having adhesive with a heat treatment step in accordance with embodiments disclosed herein.
Figure 12:
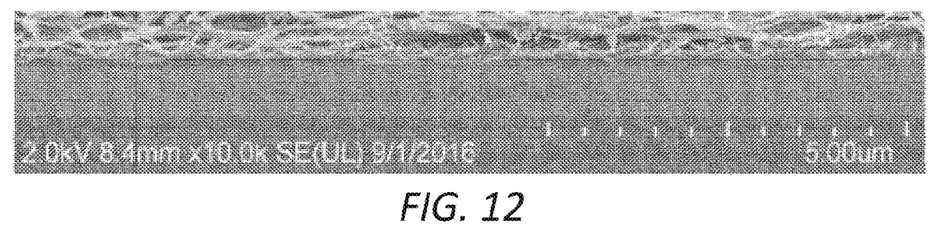
FIG. 12 is a SEM image of the bonded area of a protective cover having no adhesive without a heat treatment step.
Figure 13:
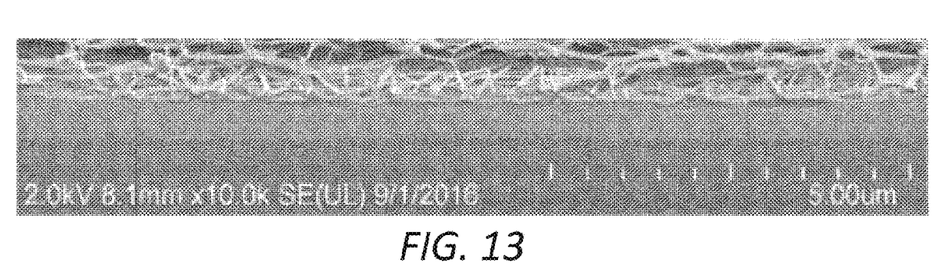
FIG. 13 is a SEM image of the bonded area of a protective cover having no adhesive with a heat treatment step.

Using the same membrane as Example 6, an ePTFE having a mass/area of 0.5 g/m$^2$, SEM images were taken to observe the flow through of different adhesive materials. In FIGS. 10 and 11, the adhesive is TPA107 and showed flow into the pores without heat treatment in FIG. 10 and with heat treatment in FIG. 11. In FIGS. 12 and 13, the adhesive was TPA122 and did not flow into the pores of the membrane with or without heat treatment.

Example 8

The viscoelastic properties of the adhesives were measured using small amplitude oscillatory shear (SAOS) on a rotational rheometer (ARES-G2 rotational Rheometer, New Castle Del., USA). Disk-shaped specimen of the adhesives were prepared with a diameter of 8 mm and a nominal thickness of about 1 mm. The rotational rheometer was accessorized with 8 mm diameter parallel plates. The plates were preheated to the target temperature of the rheological measurement, in this case 25° C., and also zero gap referenced at target temperature. A prepared specimen was mounted on the rheometer parallel plates and the gap was lowered to about 1 mm.

The SAOS procedure used was an Oscillation Frequency Sweep. It consists of applying a small amplitude sinusoidal strain and measuring the corresponding sinusoidal stress. The phase shift (phase angle delta) between the input (in this case strain) and output (in this case stress) signals is also measured. The frequency range applied was between $10^2$ to $10^{-2}$ rad/s at 5 points per decade.

The tangent of delta represents the ratio of the viscous (represented by the viscous shear modulus G") to elastic (represented by the elastic shear modulus G') responses of a viscoelastic material as shown in Equation (X).

$$\tan(\text{delta}) = \frac{G''}{G'}$$

Comparing the adhesives' tan(delta) responses at low frequencies (which is equivalent to long time behavior) sheds light into the ratio of their viscous to elastic responses. Tan(delta) at a frequency of $10^{-2}$ rad/s was taken to be most representative of flow. Having a higher tan delta indicates that the adhesive is more viscous. Lower tan delta indicates that adhesive exhibits more solid behavior. Table 6 shows results for various adhesives. As shown in this table, the more rigid adhesives—5605R and 5610R have lower tan delta values. This correlates with the testing above that found that these adhesives are difficult to flow into the pores of the membrane, even with increased temperature and/or pressure.

TABLE 6

| Adhesive | Trade Name | Tan(delta) @ 0.01 rad/s |
| --- | --- | --- |
| Nitto 5610R | Stiffened Acrylic | 0.1946741 |
| Nitto 5605R | Stiffened Acrylic | 0.21858615 |
| TPA117 | Teraoka, 7641M | 0.3255207 |
| TPA122 | Sekisui 5201WPB Acrylic | 0.33997464 |
| TPA119 2920 | Sliontec 5621 (Acrylic/Silicone Hybrid) - Acrylic Side | 0.35765073 |
| 3M 82600 | 3M 82600 | 0.43173784 |
| TPA112 | DIC 8800SD | 0.49184006 |
| TPA115 | 3M 9511 | 0.509973 |
| GA3004 | Adhesives Research, 4 mil silicone | 0.54826903 |
| TPA107 | Tesa, Acrylic, 4972 | 0.5894409 |
| TPA 119 3038 | Sliontec 5621 (Acrylic/Silicone Hybrid) - Silicone Side | 0.6023851 |

Example 9

The membrane is a porous expanded polytetrafluoroethylene having a mass/area ratio of 9.9 g/m², bubble point of 342.6 kPa (49.7 psi), ATEQ of 7 L/hr, and thickness of 12.9 µm. The adhesive material is TPA107 (Tesa 4972). No enhancement of Z-strength in the stud pull test was recorded for this heavier membrane.

The invention has now been described in detail for the purposes of clarity and understanding. However, those skilled in the art will appreciate that certain changes and modifications may be practiced within the scope of the appended claims.

In the preceding description, for the purposes of explanation, numerous details have been set forth in order to provide an understanding of various embodiments of the present invention. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present invention. Accordingly, the above description should not be taken as limiting the scope of the present invention or claims.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the present invention, subject to any specifically excluded limit in the stated range. Where the stated range includes one or both of the limits, ranges excluding either or both of those included limits are also included.

As used herein and in the appended claims, the singular forms "a", "an", and "the" include plural references unless the context clearly dictates otherwise. Also, the words "comprise," "comprising," "contains," "containing," "include," "including," and "includes," when used in this specification and in the following claims, are intended to specify the presence of stated features, integers, components, or steps, but they do not preclude the presence or addition of one or more other features, integers, components, steps, acts, or groups.

What is claimed is:

1. A protective cover assembly comprising a porous expanded membrane having a plurality of pores, a first surface and a second surface opposite the first surface, wherein the porous expanded membrane comprises an active area and a bonded area, wherein the bonded area comprises an adhesive material that forms a bridge extending through the plurality of pores in the bonded area from the first surface to the second surface, and wherein there is no backing layer adjacent to the porous expanded membrane.

2. The assembly of claim 1, wherein the adhesive material does not extend beyond a plane of the first surface.

3. The assembly of claim 1, wherein a distance between the first surface and the second surface is less than or equal to 20 microns.

4. The assembly of claim 1, further comprising at least one releasable liner adjacent to the first surface or the second surface.

5. The assembly of claim 4, wherein a first peel strength of the bonded area is greater than a second peel strength of the active area.

6. The assembly of claim 4, wherein a first peel strength of the bonded area is greater than or equal to $1 \times 10^8$ Pa.

7. The assembly of claim 1, wherein the porous expanded membrane has a mass/area ratio of less than or equal to 3 g/m².

8. The assembly of claim 1, wherein the porous expanded membrane has a mass/area ratio from 0.2 q/m² to 3 g/m².

9. The assembly of claim 1, wherein the porous expanded membrane comprises an expanded fluoropolymer or an expanded polyolefin.

10. The assembly of claim 1, wherein the adhesive material has a tan delta at $10^{-2}$ rad/s of greater than or equal to 0.4.

11. The assembly of claim 1, wherein the adhesive material comprises an acrylic, polyamide, polyacrylamide, polyester, polyolefin, polyurethane, or polysilicone.

12. The assembly of claim 1, wherein at least 10% of the plurality of pores in the bonded area comprise an adhesive material.

13. The assembly of claim 1, wherein the plurality of pores remain open when the porous expanded membranes is compressed.

14. An electronic device, comprising:
a housing having an opening therein,
an acoustic transducer positioned in the housing near to the opening, and
the protective cover assembly of claim 1 positioned covering the opening.

15. A protective cover assembly comprising a porous expanded membrane having a plurality of pores, wherein the porous expanded membrane comprises an active area and a bonded area, wherein at least 10% of the plurality of pores in the bonded area comprise an adhesive material, wherein there is no backing layer adjacent to the porous expanded membrane.

16. The assembly of claim 15, wherein a first peel strength of the bonded area is greater than a first peel strength of the active area.

17. The assembly of claim 15, wherein a first peel strength of the bonded area is greater than or equal to $1 \times 10^8$ Pa.

18. The assembly of claim 15, wherein the porous expanded membrane has a mass/area ratio of less than or equal to 3 g/m².

19. The assembly of claim 15, wherein the porous expanded membrane has a mass/area ratio from 0.2 q/m² to 3 g/m².

20. The assembly of claim 15, wherein the porous expanded membrane comprises an expanded fluoropolymer or an expanded polyolefin.

21. The assembly of claim 15, wherein the adhesive material has tan delta at $10^{-2}$ rad/s of greater than or equal to 0.4.

22. The assembly of claim 15, wherein the adhesive material comprises an acrylic, polyamide, polyacrylamide, polyester, polyolefin, polyurethane, or polysilicone.

23. The assembly of claim 15, wherein the porous expanded membrane has a first surface and a second surface opposite the first surface; and the adhesive material forms a bridge from one of the first or second surface of the porous expanded membrane to the opposing surface.

24. The assembly of claim 15, wherein at least 70% of the plurality of pores in the bonded area comprise the adhesive material.

25. The assembly of claim 15, wherein less than 1% of the plurality of pores in the active area comprise the adhesive material.

26. An electronic device comprising
a housing having an opening therein,
an acoustic transducer positioned in the housing near to the opening, and
the protective cover assembly of claim 15 positioned covering the opening.

* * * * *